United States Patent
Cullen et al.

[11] Patent Number: 5,241,855
[45] Date of Patent: Sep. 7, 1993

[54] METHOD AND APPARATUS FOR INFERRING ENGINE TORQUE

[75] Inventors: Michael J. Cullen, Dearborn; James M. Kindree; Bruce J. Palansky, both of Livonia; Rocco Bellino, Canton; Joseph N. Ulrey, Dearborn, all of Mich.

[73] Assignee: Ford Motor Company, Dearborn, Mich.

[21] Appl. No.: 786,229

[22] Filed: Oct. 31, 1991

[51] Int. Cl.⁵ .......................... G01M 15/00
[52] U.S. Cl. ............................... 73/117.3
[58] Field of Search .................. 73/116, 117.3; 364/431.03, 431.04

[56] References Cited

U.S. PATENT DOCUMENTS

| | | | |
|---|---|---|---|
| 3,921,446 | 11/1975 | Ludloff | 73/117 |
| 4,036,049 | 7/1977 | Hanson | 73/116 |
| 4,301,678 | 11/1981 | Full et al. | 73/116 |
| 4,467,640 | 8/1984 | Morrison | 73/117.3 |
| 4,601,270 | 7/1986 | Kimberley et al. | 123/357 |
| 4,915,079 | 4/1990 | Holmes | 364/431.08 |
| 5,060,618 | 10/1991 | Takaoka et al. | 123/436 |
| 5,089,964 | 2/1992 | Morishige et al. | 364/424.1 |

Primary Examiner—Robert Raevis
Attorney, Agent, or Firm—Peter Abolins; Roger L. May

[57] ABSTRACT

A method of inferring and predicting engine torque uses a function of a speed/load table, air/fuel ratio and spark advance. The effects of the magnitudes of engine spark retard, rich or lean air/fuel ratios and exhaust gas recirculation are accounted for using a series of multipliers. Friction torque is accounted for through a speed/air charge table look-up.

7 Claims, 10 Drawing Sheets

METHOD AND APPARATUS FOR INFERRING ENGINE TORQUE

BACKGROUND OF THE INVENTION

1. Field of the Invention

This invention relates to engines and in particular to inferring the torque produced by an engine. One use of such an inferred engine torque is as an input parameter for a control system governing operation of an automatic transmission associated with the engine.

2. Prior Art

Knowledge of engine torque is required as an input for automatic transmission control strategies and transmission failure mode management strategies.

Direct measurement of engine torque is not currently practical so various inferences have been used over the years in both mechanically controlled powertrains and microprocessor controlled powertrains.

Known mechanical transmission control systems predicted torque from throttle angle or engine intake manifold vacuum and an aneriod atmospheric pressure sensor.

These mechanical systems suffered from many sources of error including the influence of exhaust gas recirculation rate on the prediction, changes in accessory torque losses, and changes in friction torque during the warmup period or over the life of the engine.

Known microprocessor based powertrain control systems inferred engine torque from engine speed and engine airflow. For systems equipped with a manifold pressure sensor the airflow was calculated after accounting for the influence of exhaust gas recirculation. Thus this source of error was minimized. A lookup function of air conditioning torque versus engine speed was used to adjust the predicted torque when the air conditioner clutch was enabled by the microprocessor.

These early microprocessor based torque prediction systems were subject to the effect of changes in spark advance, EGR percent, and air/fuel ratio which occur over various barometric pressures, ambient temperatures and time since engine startup.

Referring to FIG. 2, also known in the prior art is an electronic engine control module including a stored table 118 which is a MBT spark adjustment for air/fuel read only memory function and has an input from air/fuel ratio input 115. A block 119 is an indicated torque adjustment for air/fuel ratio and has an input from air/fuel ratio input 115. A block 120 has a stored table for an unadjusted MBT spark and has inputs from engine speed rpm input 116 and air charge input 117. A block 121 is an unadjusted indicated torque round table and has inputs from engine speed rpm input 116 and engine air charge input 117. A block 122 has a stored table indicating friction torque read only memory table and has inputs from air charge input 117 and engine speed rpm indicator input 116. A block 123 is a MBT spark adjustment for EGR, read only memory scalar and has an input from engine EGR rate input 114.

A summer 124 has positive inputs from block 118, block 123, and block 120 to provide an adjusted MBT spark which is the sum of the outputs of blocks 118, 123 and 120. A summer 125 has a negative input from spark timing input 113 and a positive input from adder 124 to determine the difference between MBT and actual spark advance. The output of summer 125 is applied to a table storing the indicated torque adjustment for spark retard in a block 126. The output of block 126 is applied to a multiplier 127 which also has inputs from block 119 and block 121. Multiplier 127 provides an adjusted indicated torque which is the product of blocks 119, 121, and 126. The output of multiplier 127 is applied to a summer 128. As an output of block 128, brake torque is indicated less friction torque. The output of summer 128 is applied to a coupling to transmission 111.

This level of microprocessor based control system had inaccuracies due to air conditioning head pressure, power steering torque requirements, cold engine friction, green engine friction, intentional or otherwise known cylinder shutdown (via spark or injector turnoff), and the influence of non-gasoline fuels like methanol/gasoline blends in flexible fuel vehicles.

A real time torque calculation is accomplished by determining the distance (i.e., actual spark advance) from MBT spark (SPK_DELTA) by looking up MBT spark (FN1617) and adjusting it for EGR (MBTEGR) and LAMBSE (FN730) then subtracting the actual current spark (SAFTOT). Indicated (COMBUSTION) engine torque is then looked up from a table of RPM and LOAD (FN1615A) and multiplied by a function of SPK_DELTA (FN621) and a function of LAMBSE (FN623).

Thus an improved torque prediction algorithm would be desirable to account for operating variables which influence torque output including engine coolant temperature and air conditioning friction.

SUMMARY OF THE INVENTION

This invention recognizes that a predicted torque calculation can be made more accurate by predicting the air conditioning torque requirement versus head pressure, power steering torque requirements versus power steering pressure switch, cold engine friction versus time since start and engine coolant temperature, green engine friction versus total engine revolutions since new, and the influence of non-gasoline fuels like methanol measured by a percent methanol sensor. The effect of intentional or otherwise known engine cylinder shutdown is also accounted for.

DETAILED DESCRIPTION OF THE INVENTION

Figure 1:
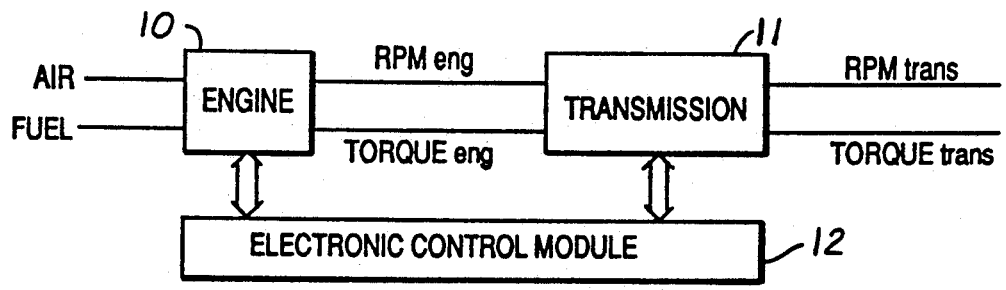
FIG. 1 is a block diagram of a means for inferring engine torque in accordance with an embodiment of this invention.
Figure 2:
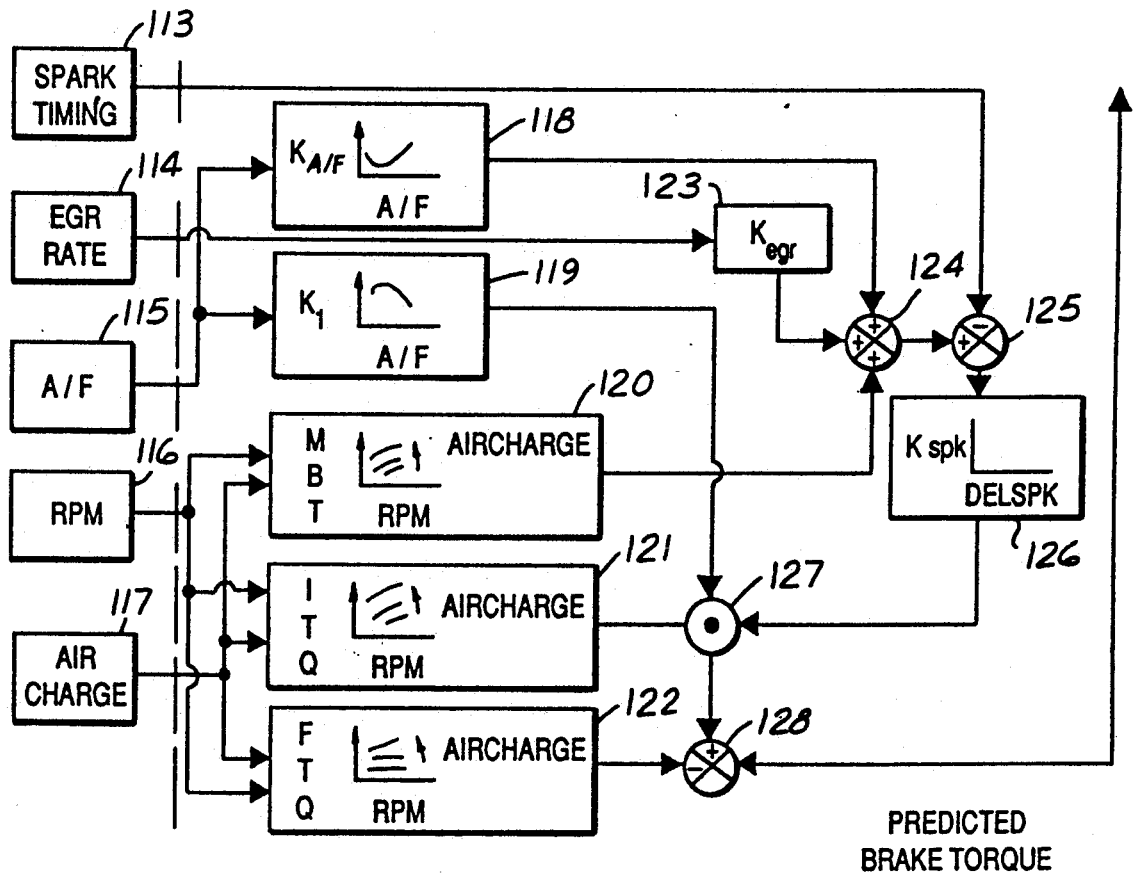
FIG. 2 is a logic flow diagram of the operation of an electronic engine control module in accordance with the prior art.

Torque calculation in accordance with an embodiment of this invention advantageously uses a speed/load table of indicated engine torques for 100% gasoline, all engine cylinders enabled, a stoichiometric air/fuel ratio, MBT spark, and 0% exhaust gas recirculation rate (EGR). The effects of percentage methanol, number of cylinders firing, spark retard, rich or lean air/fuel ratios, and EGR are accounted for through a series of multipliers. The calculations are based on indicated torque because the effects above act on top of the pistons, independently of various frictional losses which subtract from the indicated torque before it impacts the transmission. This formulation thus allows the effects to be accounted for with relatively simple indicated torque multipliers.

Alternately, the base indicated torque tables could be defined for a fuel other than gasoline, and the percent methanol modified could be for other flexible fuels like propane.

Torque calculation in accordance with an embodiment of this invention advantageously uses a speed-/AIRCHG table of friction torques for a warmed up engine, with friction stabilized (no longer reducing with engine hours), air conditioning clutch disabled, and power steering at straight ahead pressure level. Additional friction due to deviation from the above conditions always add to the friction torque.

The effect of cold engine friction is predicted from a table of engine coolant temperature and the time since the engine was started. Alternately, an oil temperature sensor replaces the engine coolant temperature sensor.

The effect of air conditioning torque requirements are predicted first from a flag indicating that the microprocessor has enabled the air conditioner clutch, and then from a table of torque requirements versus air conditioning head pressure and engine speed. Alternately, if the vehicle is not equipped with a head pressure sensor, inlet air temperature is a suitable predictor for head pressure and the table of torque requirements is a function of engine speed and inlet air temperature.

The effect of power steering torque requirements are predicted from a table of torque requirements versus power steering pressure level and engine speed. In its simplest form the power steering pressure is a two position switch indicating high and low pressure. Alternately, it is a continuous measurement.

The effect of green engine friction is predicted from an engine hour meter if the vehicle is so equipped. Alternately total engine revolutions could be used. The green engine friction torque losses are contained in a lookup table versus engine speed and engine hours.

In summary, the designations for inputs used in the torque calculation are:

RPM—engine speed (revolutions/minute), a sensor input.

AIRCHG—air charge lbs/cylinder-filling) which equals an estimate of air mass flow, (AM lbs/minute) divided by the number of cylinder fillings per minute: AIRCHG=AM/(RPM * ENGCYL/2) AM may be a direct output of an air meter or calculated in speed-density system.

SPK—final spark advance (degree BTDC), calculated and output by the microprocessor.

A/F—air/fuel ratio, a calculation modified by a feedback sensor.

EGR—actual EGR percent (%), a sensor input.

AC_FLG—air conditioning flag (1=A/C clutch engaged, 0=A/C clutch freewheeling), an output of the microprocessor.

ECT—engine coolant temperature (degrees Fahrenheit), a sensor input.

ACT—inlet air temperature (degrees Fahrenheit), a sensor input.

AC_PRES—air conditioning head pressure (inches Mercury), a sensor input.

PS_PRES—power steering pressure (inches Mercury), a sensor input.

TIMER—time since engine was started, a calculation.

PCT_METH—percent methanol in fuel (%), a sensor input.

FIRING_CYLS—number of cylinders firing which can be less than the number available, ENGCYL, for instance during decel fuel shutoff modes, a calculation by the microprocessor.

The designation for the output used in the torque calculation is:

BRAKE_TQ—brake engine torque (Fft-lbs)

The designations for calibration items used in the torque calculation are:

ENGCYL—number of engine cylinder available (=8 for 8 cylinder engine).

BASE_ITQ(RPM,AIRCHG)—a table containing indicated torque at MBT spark, stoichiometric air/fuel ratio 0% EGR, 100% gasoline, all cylinders firing.

ITQSPKMUL(SPKDEL)—indicated torque multiplier versus degrees of spark retard from MBT.

STOIC_A/F(PCT_METH)—the stoichiometric A/F ratio corresponding to the percent methanol.

ITQAFMUL(EQUIV_RATIO)—indicated torque multiplier versus equivalence ratio (air/fuel ratio divided by stoichiometric equivalence ratio for given percent methanol).

ITQPMMUL(PCT_METH)—indicated torque multiplier versus percent methanol.

BASE_MBT(RPM,AIRCHG)—a table of MBT spark values values corresponding to BASE_ITQ.

MBTAF(EQUIV_RATIO)—adder to BASE MBT due to deviation from stoichiometric equivalence ratio.

MBTPEREGR(AIRCHG)—number which when multiplied by percent EGR produces an adder to BASE_MBT.

MBTPM(PCT_METH,AIRCHG)—adder to BASE_MBT which accounts for less than 100% gasoline (percent methanol).

MBTCOLD(ECT,AIRCHG)—adder which accounts for increase in BASE MBT when engine is cold.

BASE_FRIC_TQ(RPM,AIRCHG)—a table of friction torque values for a warmed-up engine, broken-in (friction stabilized), air conditioning clutch disabled, power steering at a base pressure level (straight ahead).

Note, the following tables have the suffix "TEA". This stands for Torque Equivalent AIRCHG. Multiplying the output of these tables by the TQ_PER AIRCHG constant Yields the desired torque for the balance of the calculations. The data is stored in AIRCHG units for convenience of sharing with other strategy elements needing similar information such as idle stability control.

COLD_FRIC_TEA(ECT,TIMER)—torque equivalent AIRCHG for cold friction versus engine coolant temperature and the time since the engine was started.

AC_FRIC_TEA(RPM,AC_HEAD_PRES)—torque equivalent AIRCHG for the air conditioner torque requirements versus engine speed and air conditioning head pressure.

GREEN_FRIC_TEA(RPM,ENG_HOURS)—adder which when converted to torque compensates for higher friction in a new ("green") engine.

PS_FRIC_TEA(RPM,PS_PRES)—adder which when converted to torque compensates BASE FRIC_TQ for power steering pump torque requirements.

The torque calculation is performed by the following sequence of operations:

```
AIRCHG = AM/(ENGCYL*N)
STOIC_A/F = (100 − PCT_METH)*14.6 * PCT_METH*7.6
EQUIV_RATIO = A/F / STOIC_A/F
SPK_MBT = BASE_MBT(RPM,AIRCHG) + MBTAF(EQUIV_RATIO) +
          MBTPEREGR(AIRCHG)*EGR +
          MBTPM(PCT_METH,AIRCHG) +
          MBTCOLD(ECT,AIRCHG)
SPKDEL = SPK_MBT − SPK
IND_TQ = BASE_ITQ(RPM,AIRCHG) * ITQSPKMUL(SPKDEL)
         * ITQAFMUL(EQUIV_RATIO) * ITQPMMUL(PCT_METH)
         * FIRING_CYLS/ENGCYL
MISC_FRIC_TEA = COLD_FRIC_TEA(ECT,TIMER)
              + AC_FRIC_TEA(RPM,AC_HEAD_PRES)
              + PS_FRIC_TEA(RPM,PS_PRES)
              + GREEN_FRIC_TEA(RPM,ENG_HOURS)
MISC_FRIC_TQ = MISC_FRIC_TEA * TQ_PER_AIRCHG
TOTAL_FRIC_TQ = BASE_FRIC_TQ + MISC_FRIC_TQ
BRAKE_TQ = IND_TQ − TOTAL_FRIC_TQ
```

All of the above functions can be developed from engine mapping data. Some data is stored as torque equivalent airflows to enable its use for idle stability control strategy.

Figure 3:
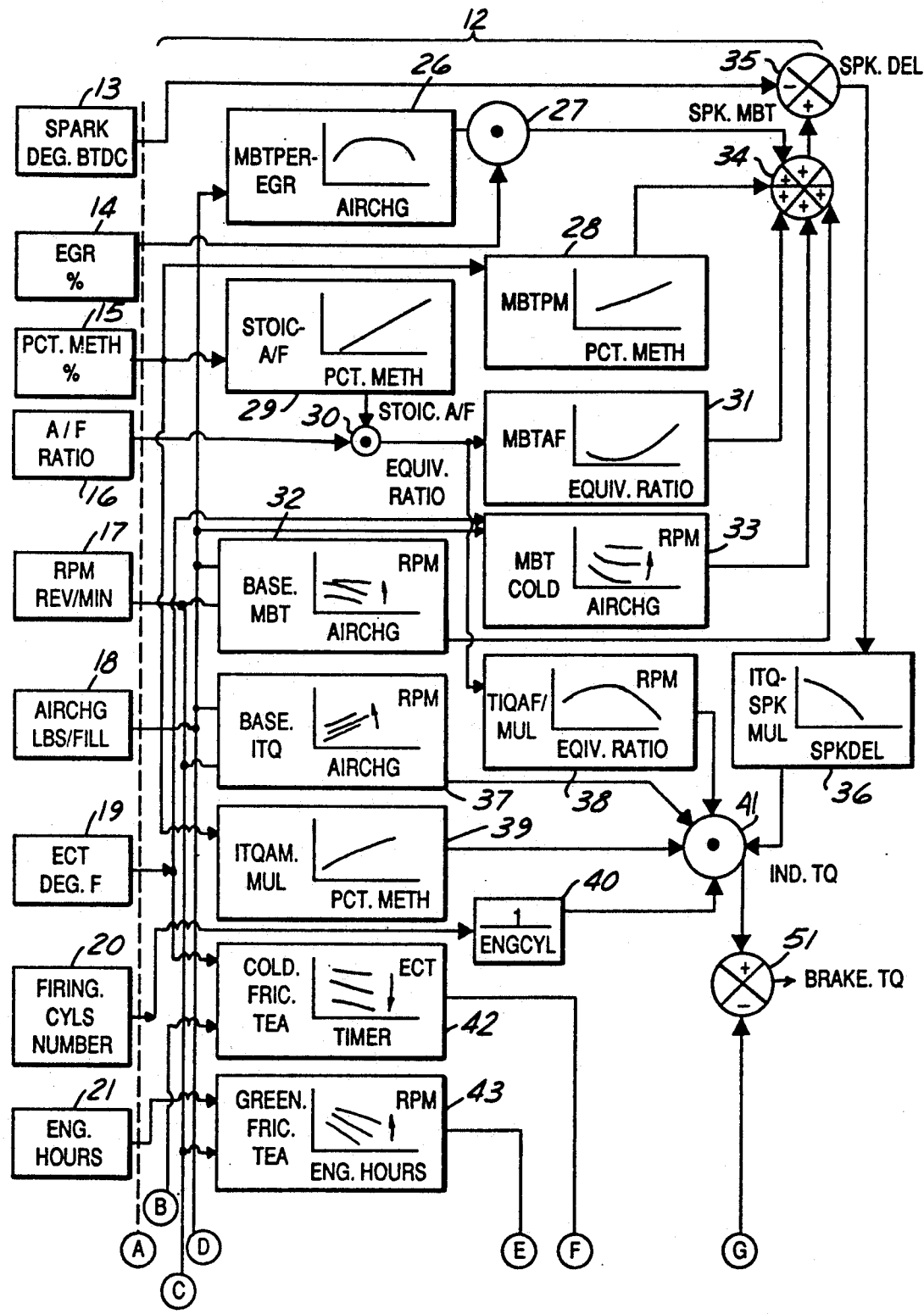
FIGS. 3 and 3A is a logic flow diagram of the operation of an electronic engine control module in accordance with an embodiment of this invention.
Figure 3A:
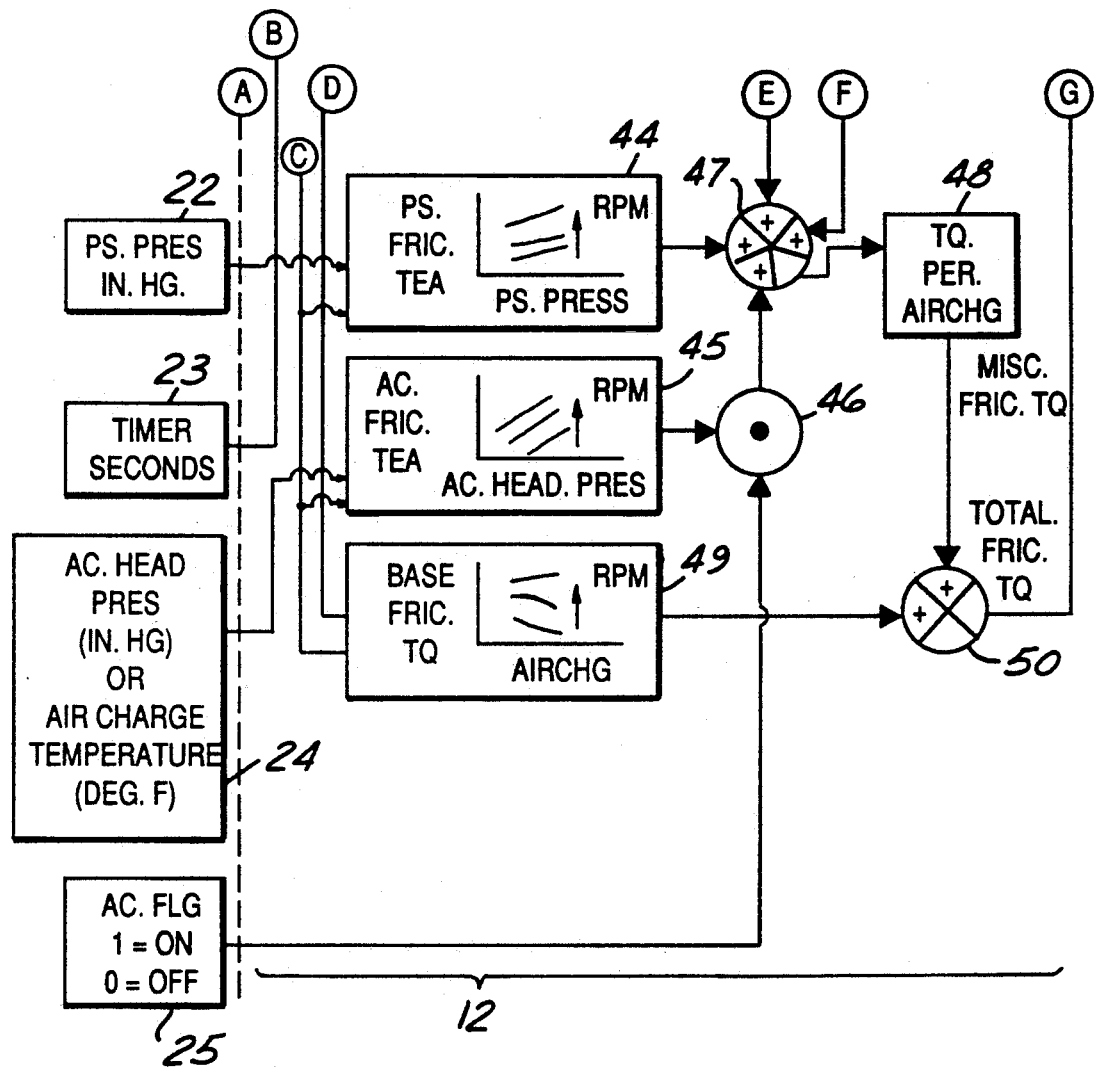

Referring to FIGS. 1, 3, and 3A, air and fuel are applied to an engine 10 which has a torque and a rpm output applied to a transmission 11. Both engine 10 and transmission 11 are coupled to an electronic engine control module 12 which includes various algorithms for processing a spark timing input 13, an exhaust gas recirculation rate input 14, a percent methanol fuel input 15, an air/fuel ratio input 16, an engine rpm input 17, an engine air charge input 18, an engine coolant temperature 19, a firing cylinder indication input 20, engine operating hours 21, power steering pressure 22, a timer input 23, an input 24 indicating air conditioning head pressure or air change temperature, and a flag input 25 indicating air conditioning on or off.

Referring to FIGS. 1, 3, and 3A electronic engine control module 12 includes a stored table 26 which is a MBT spark adjustment for EGR read only memory function and has an input from AIRCHG input 18. The output of table 26 is applied to a multiplier 27 which also has inputs from EGR input 14. A block 28 is a MBT spark adjustment for percent methanol and has an input from PCT_METH input 15. A block 29 has a stored table for the stoichiometric fuel/air ratio as a function of percent methanol and has an input from PCT_METH input 15. Multiplier 30 provides an equivalence ratio which is the product of stoichiometric fuel/air ratio from block 29 and the of air/fuel ratio input 16.

When there is no percent methanol input 15, e.g. in situations where only gasoline is used and the fuel, the stoichiometric fuel to air ratio of 0.0685 is used as a multiplier in place of block 29. A block 31 is a MBT spark adjustment for equivalence ratio and has an input from multiplier 30. A block 32 has a stored table for an unadjusted MBT spark and has inputs from engine speed RPM input 17 and air charge input 18. A block 33 has a stored table of MBT spark adjustments for cold engine coolant temperature and has inputs from ECT input 19 and AIRCHG input 18.

A summer 34 has positive inputs from multiplier 27, block 28, block 31, block 32 and block 33 to provide an adjusted MBT spark which is the sum of the output of multiplier 27 and blocks 28, 31, 32, and 33. A summer 35 has a negative input from spark timing input 13 and a positive input from adder 34 to determine the difference between MBT and actual spark advance. The output of summer 35 is applied to a table storing the indicated torque adjustment for spark retard in a block 36.

A block 37 is an unadjusted indicated torque round table and has inputs from engine speed RPM input 17 and engine air charge input 18.

A block 38 is an indicated torque adjustment for equivalence ratio and has an input from multiplier 30.

A block 39 is an indicated torque adjustment for percent methanol and has an input from PCT_METH input 15.

A block 40 is an indicated torque adjustment for the percent of engine cylinders firing and has an input from FIRING_CYLS input 20 and read only memory scalar ENGCYL, the number of cylinders available.

Multiplier 41 has positive inputs from block 36, block 37, block 38, block 39, and block 40 to provide indicated torque which is the product of the outputs of block 36, block 37, block 38, block 39, and block 40.

A block 42 has cold friction torque equivalent airflow and has inputs from engine coolant temperature input 19 and time since start input 23. A block 43 has green engine friction torque equivalent airflow and has inputs from engine hours input 21 and engine speed RPM input 17. A block 44 has power steering pump torque equivalent airflow and has inputs from power steering pressure input 22 and engine speed RPM input 17. A block 45 has air conditioning compressor torque equivalent airflow when the air conditioner is turned on and has inputs fro air conditioning head pressure input 24 and engine speed RPM input 17. The output of block 45 is applied to a multiplier 46 which also has inputs from AC FLAG input 25. The output of multiplier 46 is the air conditioning compressor torque equivalent airflow.

A summer 47 has positive inputs from block 42, block 43, block 44, and multiplier 46 to provide miscellaneous torque equivalent airflow which is the sum of the output of blocks 42, 43, 44, and multiplier 46.

A block 48 is a friction torque adjustment for torque equivalent airflow, read only memory scalar and has input from summer 47.

A block 49 is an unadjusted friction torque round table and has inputs from engine speed RPM input 17 and engine air charge input 18.

A summer 50 has positive inputs from block 48 and block 49 to provide total friction torque which is the sum of the output of blocks 48 and 49.

A summer 51 has a negative input form summer 50 and a positive input from multiplier 41 to provide brake torque which is the sum of the negative output of sum 50 and positive output of multiplier 41.

The output of summer 51 is used to schedule transmission line pressures and other powertrain applications.

Figure 4:
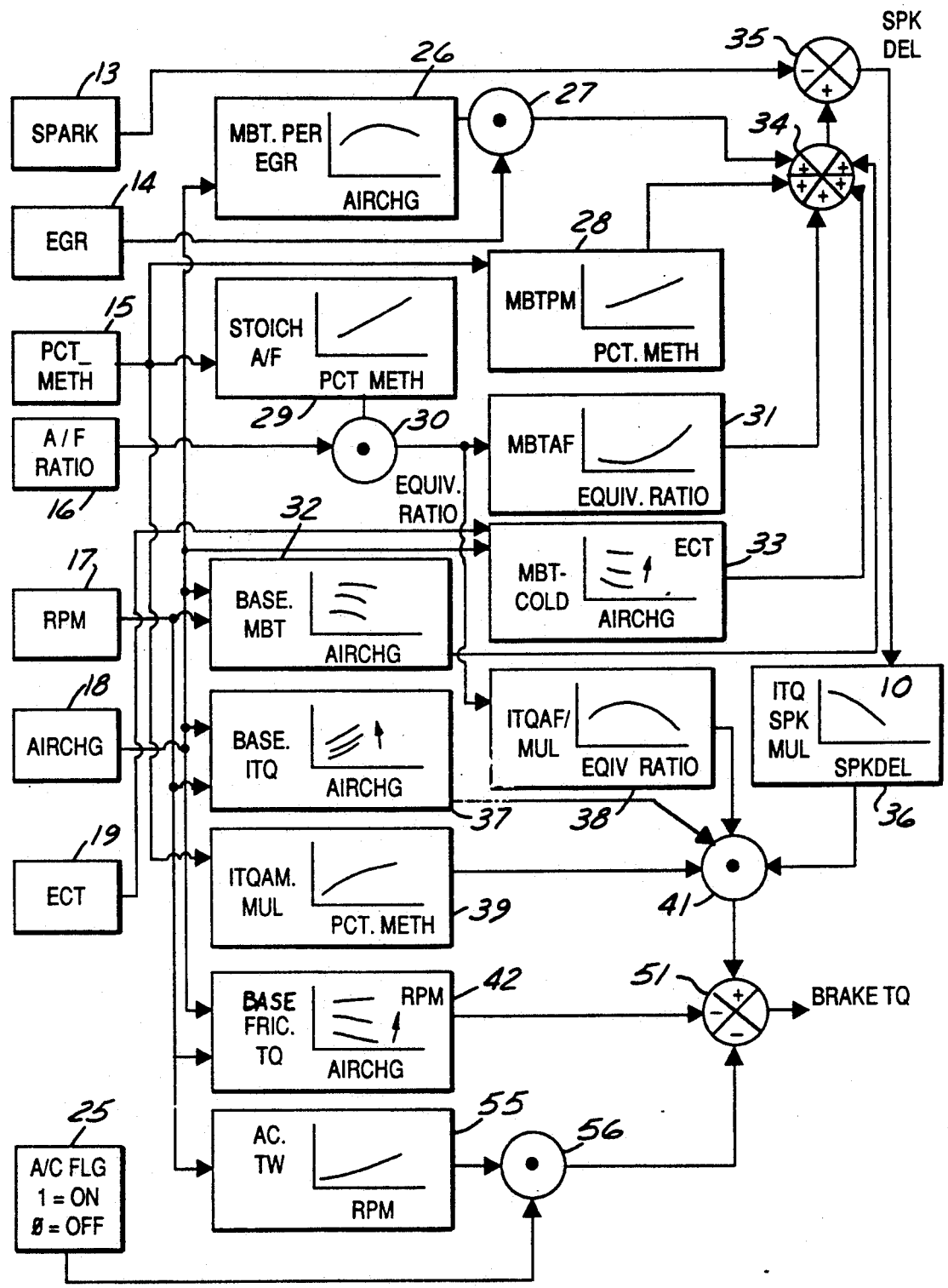
FIG. 4 is a logical diagram of the operation of the electronic control module in accordance with an embodiment of this invention including an input indicating percent methanol fuel.
Figure 5:
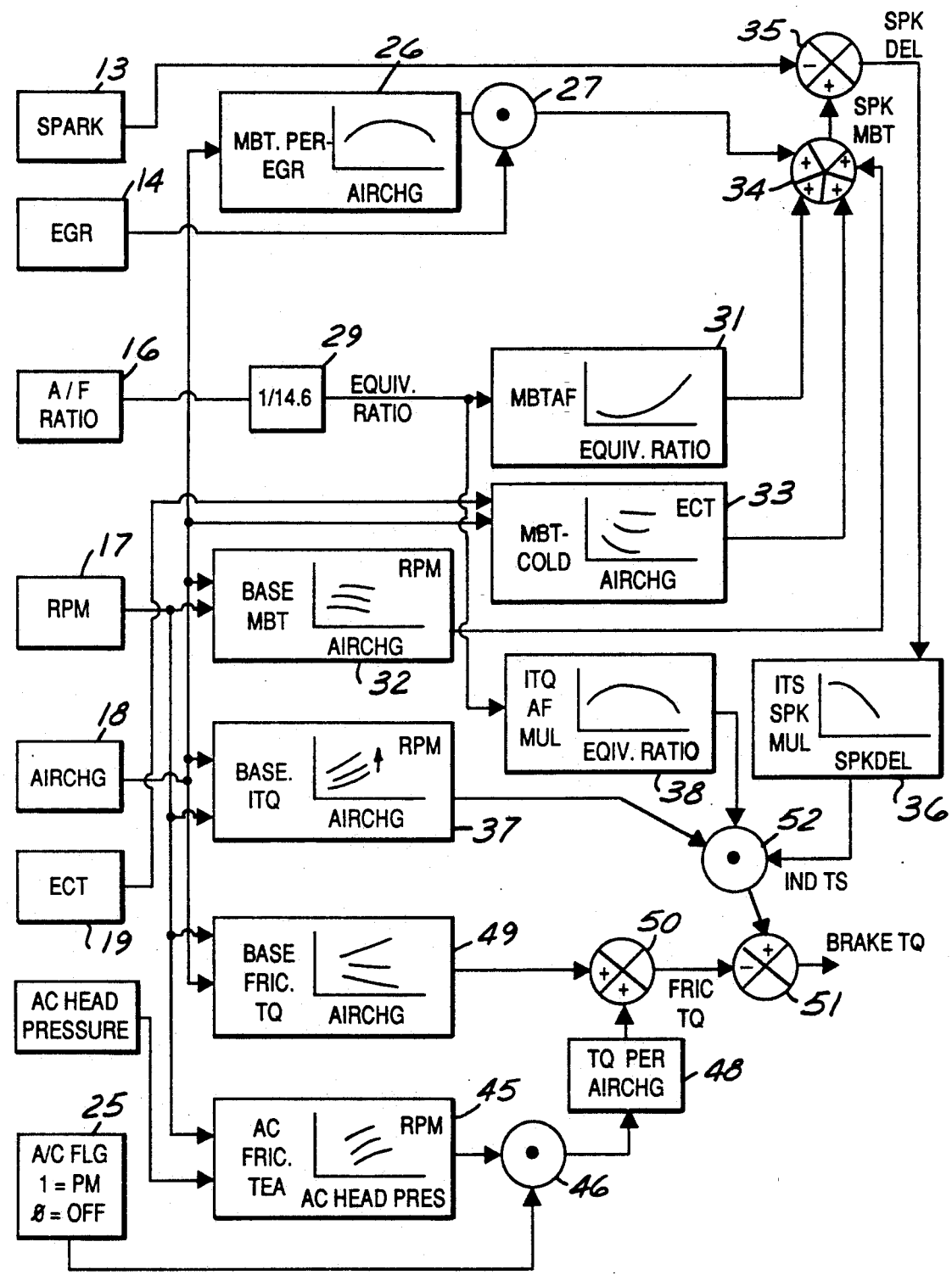
FIG. 5 is a logical diagram of the operation of the electronic control module in accordance with an embodiment of this invention including an input indicating air conditioning head pressure.
Figure 9:
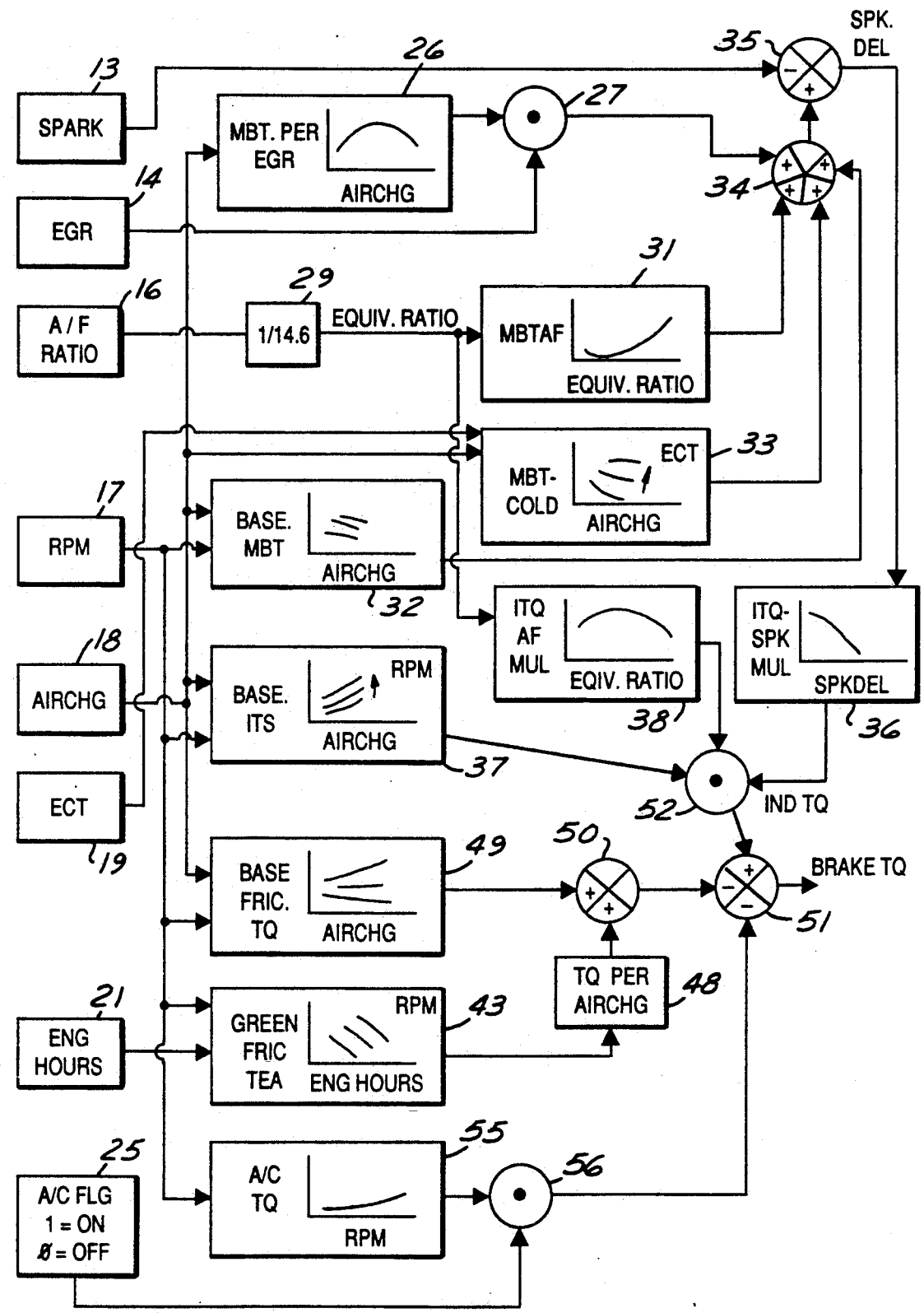
FIG. 9 is a logical diagram of the operation of the electronic control module in accordance with an embodiment of this invention including an input indicating engine operating hours.
Figure 10:
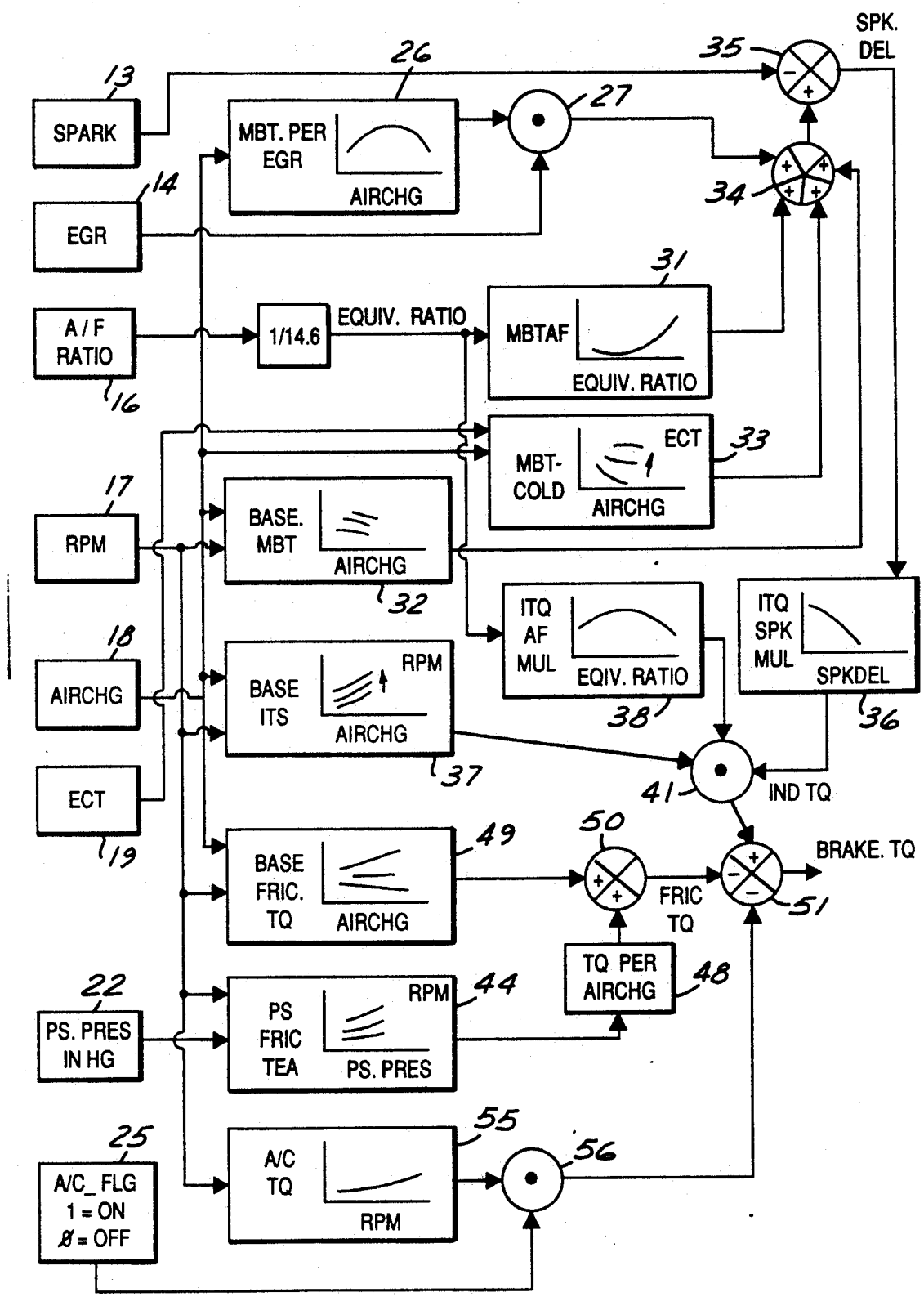
FIG. 10 is a logical diagram of the operation of the electronic control module in accordance with an embodiment of this invention including an input indicating power steering pressure.

Subcombinations of the inputs of FIGS. 3 and 3A are possible to generate a brake torque output. That is, various additional inputs can be added to a base input group combination of spark input 13, exhaust gas recirculation input 14, air/fuel ratio input 16, engine rpm input 17, air charge input 18, engine coolant temperature input 19 and air conditioning flag input 25. To the base input group can be added, separately, the following inputs to create new input combinations to generate brake torque:

1.) percent methanol input 15 (FIG. 4)
2.) air conditioning head pressure or air charge temperature input 24 (FIG. 5 and 6)
3.) timer input 23 (FIG. 7)
4.) firing cylinder number 20 (FIG. 8)
5.) engine hours input 21 (FIG. 9)
6.) power steering pressure input 22 (FIG. 10)

Figure 6:
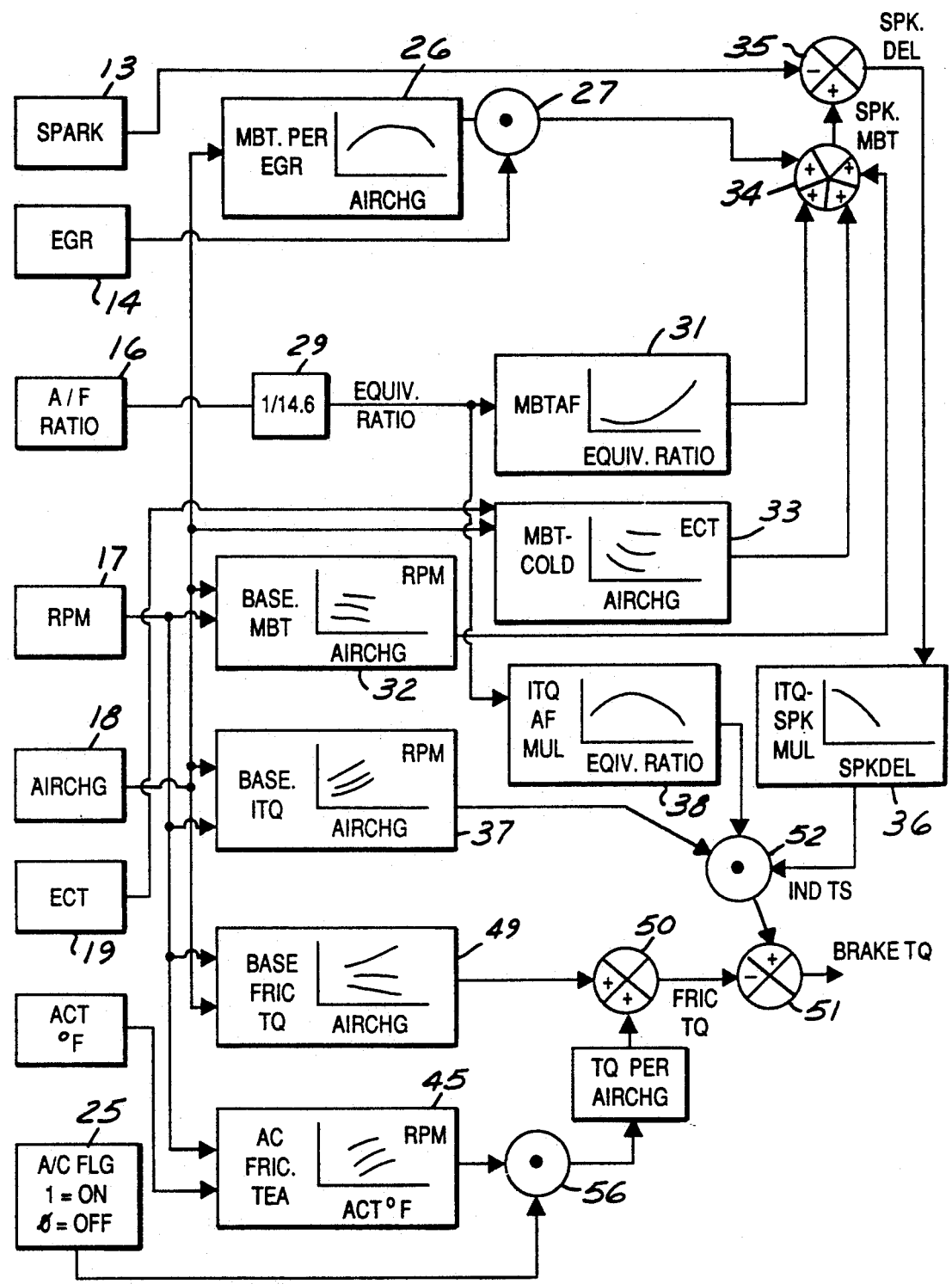
FIG. 6 is a logical diagram of the operation of the electronic control module in accordance with an embodiment of this invention including an input indicating air charge temperature.
Figure 7:
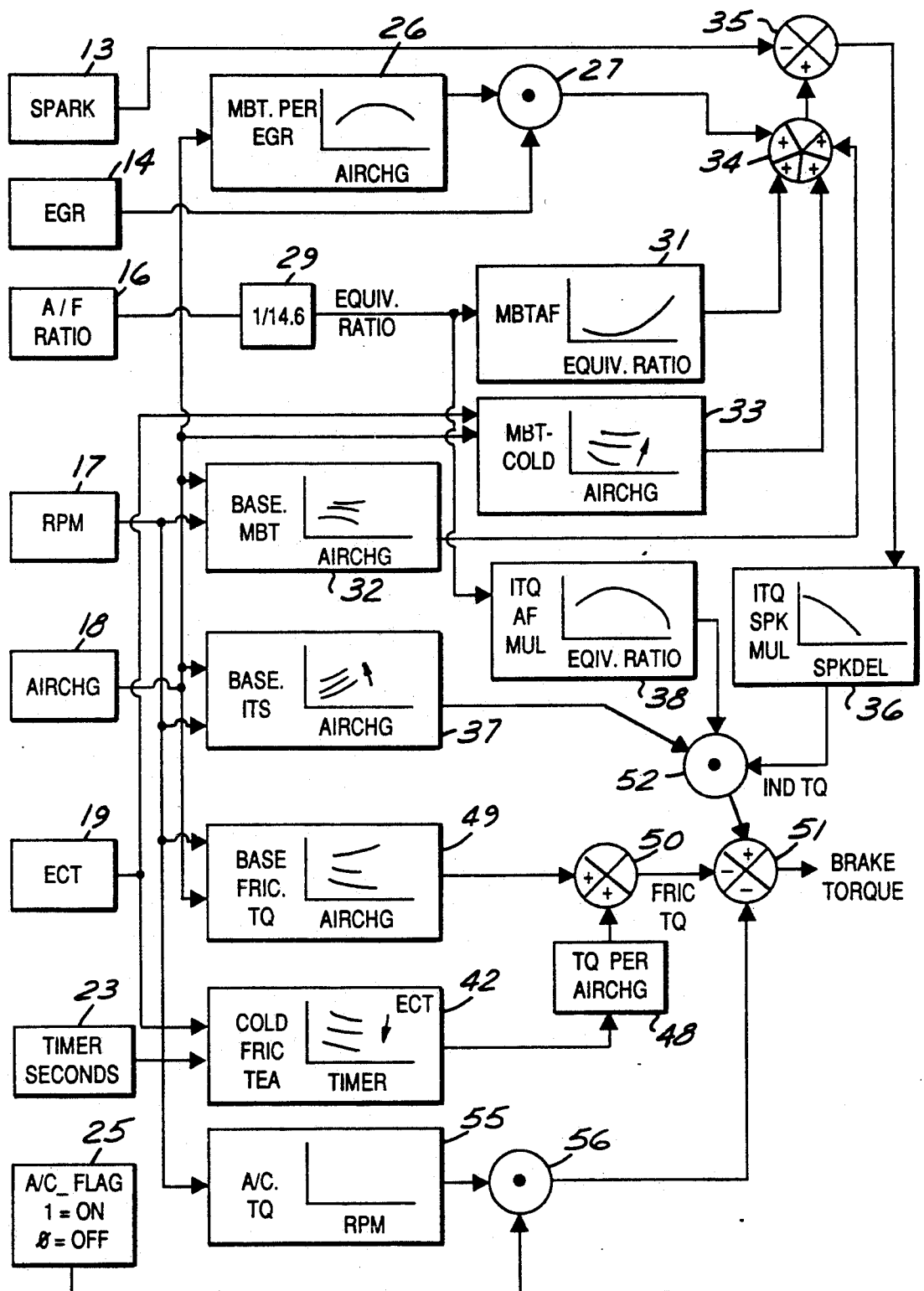
FIG. 7 is a logical diagram of the operation of the electronic control module in accordance with an embodiment of this invention including an input indicating engine cooling temperature and a timer input.
Figure 8:
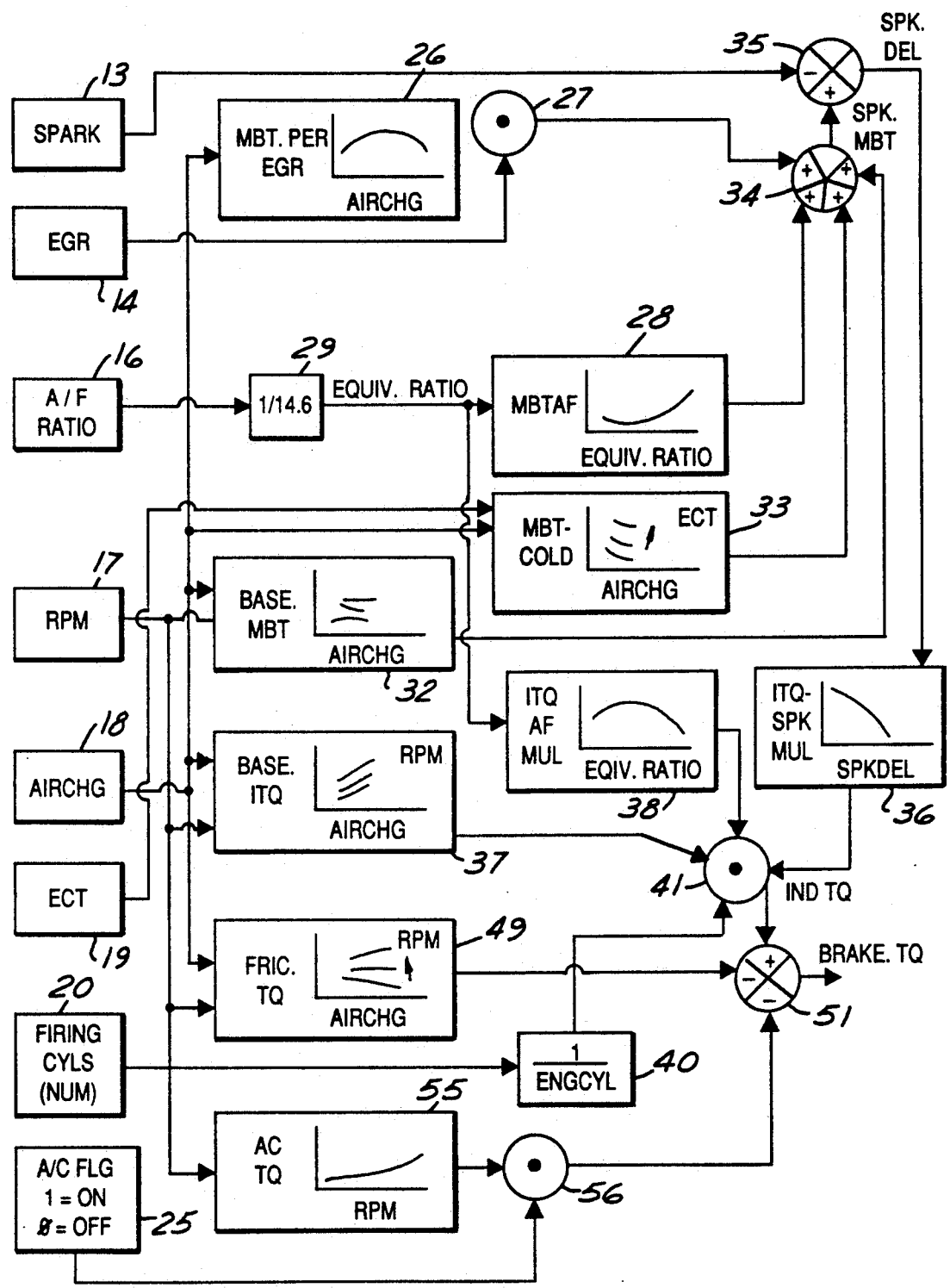
FIG. 8 is a logical diagram of the operation of the electronic control module in accordance with an embodiment of this invention including an input indicating firing cylinders.

Particularly advantageous combinations of inputs and processing blocks include those of Figures:

A) FIGS. 6, 7, and 8
B) FIGS. 5, 7, 8 and 10
C) FIGS. 5, 7, 8, 9 and 10
D) FIGS. 4, 5, 7, 8 and 10
E) FIGS. 4, 5, 7, 8, 9 and 10

The processing of the above inputs is as shown in the referred Figures and are deviations from the arrangement illustrated in and discussed in connection with FIGS. 3 and 3A. That is, tables which would normally receive information from inputs which are not used do not provide a table generated output. As mentioned before, in the absence of a percent methanol input 15, the output from table 29 is a stoichiometric fuel/air ratio of 0.068.

Various modifications and variations will no doubt occur to those skilled in the art to which this invention pertains. For example, information processing constructions other than that described herein may be used in conjunction with this invention. These and all other such variations are to be considered within the scope of the appended claims.

What is claimed:

1. A method of determining engine torques in an internal combustion engine including the steps of:

providing inputs for carrying signals indicating engine spark timing, exhaust gas circulation percent, percent methanol, air/fuel ratio, engine speed, engine coolant temperature, the number of firing cylinders, number of engine hours of operation the power steering pressure, a timer input, an air conditioning head pressure input, and an air conditioning (A/C) on/off flag;

providing stored tables in a memory indicating relationships between air charge and MBT PER EGR (a first table), stoichiometric air/fuel versus percent methanol (a second table), a MBT percent methanol versus percent methanol (a table three), and MBT air/fuel ratio versus equivalence ratio (a fourth table), a base MBT versus air charge as a function of rpm (a fifth table), MBT cold versus air charge as a function of engine coolant temperature (a sixth table), a base indicted torque versus air charge as a function of rpm (a seventh table), an indicated torque air/fuel multiplier versus equivalence ratio (an eighth table), an indicated torque percent methanol multiplier versus percent methanol (a ninth table), an indicated spark multiplier versus spark delay (a tenth table), a cold friction torque equivalent air charge versus the timer as a function of engine coolant temperature (an eleventh table), a green friction torque equivalence charge versus engine hours as a function of rpm (a twelfth table), power steering friction torque equivalent air charge versus power steering pressure as a function of rpm (a thirteenth table), an air conditioning frictional torque equivalence charge versus air conditioning head pressure as a function of rpm (a fourteenth table), a base friction torque versus air charge as a function of rpm (a fifteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said percent methanol input to said second table and said third table and said ninth table;

applying said air/fuel ratio input to a second multiplier which also receives an input from the second table, the output of the second multiplier being applied to said fourth table and said eighth table;

applying said engine speed input to said fifth table, said seventh table, said twelfth table, said thirteenth table, said fourteenth table, and said fifteenth table;

applying said engine coolant input to said sixth table and said eleventh table;

applying the number of firing cylinders input to an inverter which has an output applied to a multiplier three, which also receives input from table nine, table seven, multiplier two through table eight, said second adder through table ten;

applying inputs to adder one from table five, table six, table four, and table three;

applying said engine hours input to table twelve;

applying said power steering pressure input to table thirteen; applying said timer input to table eleven, applying said air conditioning head pressure to table fourteen, and applying the AC flag to a multiplier four which also receives an input from table fourteen;

applying the output of adder three to a torque per air charge module applying an output from said torque per air charge module to an adder four, applying an input from table fifteen to said adder four;

applying the output of adder four to an adder five as a negative input, and applying a positive input to said adder five from multiplier three; and providing an output from adder five indicating brake torque.

2. A method of determining engine torque in an internal combustion engine including the steps of:

providing inputs for carrying signals indicating engine spark timing, exhaust gas circulation percent, percent methanol, air/fuel ratio, engine speed, engine coolant temperature, and an air conditioning (A/C) on/off flag;

providing stored tables in a memory indicating relationships between air charge and MBT PER EGR (a first table), stoichiometric air/fuel versus percent methanol (a second table), and MBT percent methanol versus percent methanol (a table three), and MBT spark adder ratio versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eighth table), an indicated torque percent methanol multiplier versus percent methanol (a ninth table), an indicated spark multiplier versus spark delay (a tenth table), a base friction torque versus air charge as a function of rpm (a fifteenth table); and an air conditioning torque versus engine speed (a sixteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said percent methanol input to said second table and said third table and said ninth table;

applying said air/fuel ratio input to a second multiplier which also receives an input from the second table, the output of the second multiplier being applied to said fourth table and said eighth table;

applying said engine speed input to said fifth table, said seventh table, and said fifteenth table;

applying said engine coolant input to said sixth table;

applying inputs to adder one from table five, table six, table four, and table three;

applying the output of adder two to table ten;

applying to a multiplier three outputs from table nine, table seven, table eight, and table ten;

applying the output of multiplier three as a positive input to an adder five, applying the output of table fifteen to a negative input of adder five and applying the output of multiplier four to a negative input of adder five;

applying the AC flag to a multiplier four which also receives inputs from table sixteen; and providing an output from adder five indicating brake torque.

3. A method of determining engine torque in an internal combustion engine including the steps of:

providing inputs for carrying signals indicating engine spark timing, exhaust gas circulation percent, air/fuel ratio, engine speed, engine coolant temperature, and an air conditioning head pressure input, and an air conditioning (A/C) on/off flag;

providing stored tables in a memory indicating relationships between air charge and MBT PER EGR (a first table), stoichiometric air/fuel versus percent methanol (a second table), and MBT spark adder versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eighth table), an indicated spark multiplier versus spark delay (a tenth table), an air conditioning friction torque equivalence charge versus air conditioning head pressure as a function of rpm (a fourteenth table), a base friction torque versus air charge as a function of rpm (a fifteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said air/fuel ratio input to a fuel/air table, the output of the fuel/air ratio table being applied to said fourth table and said eighth table;

applying said engine speed input to said fifth table, said seventh table, said fourteenth table, and said fifteenth table;

applying said engine coolant input to said sixth table;

a multiplier three receives inputs from tables seven, eight and ten.

applying inputs to adder one form table five, table six, table four, and multiplier one;

applying said air conditioning head pressure to table fourteen, and applying the AC flag to a multiplier four which also receives inputs from table fourteen;

applying the output of multiplier four to a torque per air charge module applying an output from said torque per air charge module to an adder four applying an input from table fifteen to said adder four;

applying the output of summer four to an adder five as a negative input, and applying a positive input to said adder five from multiplier three; and providing an output from adder five indicating brake torque.

4. A method of determining engine torque in an internal combustion engine including the steps of:

providing inputs for carrying signals indicating engine spark timing, exhaust gas circulation percent, air/fuel ratio, engine speed, engine coolant temperature, an air conditioning (A/C) on/off flag, and an air charge temperature input;

providing stored tables in a memory indicating relationships between air charge and MBT PER EGR (a first table), stoichiometric air/fuel versus percent methanol (a second table), and MBT spark adder versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eighth table), an indicated spark multiplier versus spark delay (a tenth table), an air conditioning frictional torque equivalence charge versus air charge temperature as a function of rpm (a fourteenth table), a base friction torque versus air charge as a function of rpm (a fifteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said air/fuel ratio input to a fuel/air ratio table, the output of the fuel/air ratio table being applied to said fourth table and said eighth table;

applying said engine speed input to said fifth table, said seventh table, said fourteenth table, and said fifteenth table;

applying said engine coolant input to said sixth table;

a multiplier three receives inputs from tables seven, eight and ten;

applying inputs to adder one from table five, table six, table four, and multiplier one;

applying air change temperature to table fourteen and applying the AC flag to a multiplier four which also receives inputs from table fourteen;

applying the output of multiplier four to a torque per air charge module, applying an output from said torque per air charge module to an adder four, applying an input from table fifteen to said adder four;

applying the output of said adder four to an adder five as a negative input, and applying a positive input to said adder five from multiplier three; and providing an output from adder five indicating brake torque.

5. A method of determining engine torque in an internal combustion engine including the steps of:

providing inputs for carrying signals indicating engine spark timing, exhaust gas circulation percent, air/fuel ratio, engine speed, engine coolant temperature, a timer input, and an air conditioning (A/C) on/off flag;

providing stored tables in a memory indicating relationships between air charge and MBT PER EGR (a first table), stoichiometric air/fuel versus percent methanol (a second table), and MBT spark adder versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eight table), an indicated spark multiplier versus spark delay (a tenth table), a cold friction torque equivalent air charge versus the timer as a function of engine coolant temperature (an eleventh table), a base friction torque versus air charge as a function of rpm (a fifteenth table) an air conditioning torque versus rpm (a sixteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

applying the output of the spark input to a negative input of said second adder;

applying said air/fuel ratio input to a fuel/air ratio table the output of the fuel/air ratio table being applied to said fourth table and said eighth table;

applying said engine speed output to said fifth table, said seventh table, said fifteenth table and said sixteenth table;

applying said engine coolant input to said sixth table and said eleventh table;

applying to a multiplier three inputs from tables seven, eight and said second adder through table ten;

applying inputs to adder one from table five, table six, table four, and multiplier one;

applying said timer input to table eleven, and applying the AC flag to a multiplier four which also receives inputs from table sixteen;

applying the output of table eleven to a torque per air charge module, applying an output from said torque per air charge module to an adder four, applying an input from table fifteen to said adder four;

applying the output of adder four to an adder five as a negative input, and applying a positive input to said adder five from multiplier three; and providing an output from adder five indicating brake torque.

6. A method of determining engine torque in an internal combustion engine including the steps of:

providing inputs for carrying signals indicating engine spark timing, exhaust gas circulation percent, air/fuel ratio, engine speed, engine coolant temperature, the number of firing cylinders, and an air conditioning (A/C) on/off flag;

providing stored tables in a memory indicating relationships between air charge and MBT PER EGR (a first table), stoichiometric air/fuel versus percent methanol (a second table), and MBT spark adder versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eighth table), an indicated spark multiplier versus spark delay (a tenth table), a base friction torque versus air charge as a function of rpm (a fifteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said air/fuel ratio input to a fuel/air table the output of the fuel/air ratio table being applied to said fourth table and said eighth table;

applying said engine speed input to said fifth table, said seventh table, said fifteenth table;

applying said engine coolant input to said sixth table;

applying the number of firing cylinders input to a multiplier indicating the inverse of the number of cylinders which has an output applied to a multiplier three, which also receives inputs from table seven, eight and ten, and said second adder through table ten;

applying inputs to adder one from table five, table six, table four, and multiplier one;

and applying the AC flag to a multiplier four which also receives inputs from table sixteen applying a positive input to said adder five form multiplier three, a negative input from multiplier four, and a negative input from table fifteen; and providing an output from adder five indicating brake torque.

7. A method of determining engine torque in an internal combustion engine including the steps of:

providing inputs for carrying signals indicating engine spark timing, exhaust gas circulation percent, air/fuel ratio, engine speed, engine coolant temperature, power steering pressure, and an air conditioning on/off flag;

providing stored tables in a memory indicating relationships between air charge and MBT PER EGR (a first table), stoichiometric air/fuel versus percent methanol (a second table), and MBT air/fuel ratio versus equivalence ratio (a fourth table), a base MBT versus air charge as a function of rpm (a fifth table), MBT cold versus air charge as a function of engine coolant temperature (a sixth table), a base indicated torque versus air charge as a function of rpm (a seventh table), an indicated torque air/fuel multiplier versus equivalence ratio (an eighth table), an indicated spark multiplier versus spark delay (a tenth table), power steering friction torque equivalent air charge versus power steering pressure as a function of rpm (a thirteenth table), a base friction torque versus air charge as a function of rpm (a fifteenth table), and an air conditioning torque versus rpm (a sixteenth table);

applying the air charge input to said first table, said fifth table, said sixth table, said seventh table, and said fifteenth table;

applying the output of said first table and the output of the egr input to a first multiplier;

applying the output of the first multiplier to the positive input of a first adder;

applying an output from the first adder to the positive input of a second adder;

and applying the output of the spark input to a negative input of said second adder;

applying said air/fuel ratio input to a fuel/air ratio table the output of the fuel/air ratio table being applied to said fourth table and said eighth table;

applying said engine speed output to said fifth table, said seventh table, said thirteenth table, said fifteenth table, and said sixteenth table;

applying to multiplier three inputs from table seven and eight and an input from said second adder through table ten;

applying inputs to adder one from table five, table six, table four, and multiplier one;

applying said power steering pressure input to table thirteen, and applying the AC flag to a multiplier four which also receives inputs from table sixteen;

applying the output of table thirteen to a torque per air charge module, applying an output from said torque per air charge module to an adder, applying an input from table fifteen to said adder four;

applying the output of adder four to an adder five as a negative input, and applying a positive input to said adder five from multiplier three; and providing an output from adder five indicating brake torque.

* * * * *